United States Patent
Spielberg

(10) Patent No.: US 9,602,735 B2
(45) Date of Patent: Mar. 21, 2017

(54) DIGITAL IMAGING EXPOSURE METERING SYSTEM

(71) Applicant: International Business Machines Corporation, Armonk, NY (US)

(72) Inventor: Anthony C. Spielberg, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 13/720,788

(22) Filed: Dec. 19, 2012

(65) Prior Publication Data

US 2014/0168505 A1  Jun. 19, 2014

(51) Int. Cl.
H04N 5/235 (2006.01)
H04N 5/232 (2006.01)

(52) U.S. Cl.
CPC ....... H04N 5/2351 (2013.01); H04N 5/23293 (2013.01)

(58) Field of Classification Search
CPC .................................................. H04N 5/2351
USPC .................................. 348/362, 223.1, 221.1
See application file for complete search history.

(56) References Cited

U.S. PATENT DOCUMENTS

| | | | |
|---|---|---|---|
| 5,929,908 A | 7/1999 | Takahashi et al. | |
| 6,839,087 B1 | 1/2005 | Sato | |
| 7,689,113 B2 | 3/2010 | Tanaka et al. | |
| 7,903,168 B2 | 3/2011 | Pillman et al. | |
| 7,978,245 B2 | 7/2011 | Stavely | |
| 2007/0120987 A1* | 5/2007 | Kobayashi | 348/223.1 |
| 2008/0095431 A1 | 4/2008 | Ishiga | |
| 2009/0160968 A1* | 6/2009 | Prentice et al. | 348/223.1 |
| 2010/0328488 A1* | 12/2010 | Bamidele | H04N 5/2351 348/229.1 |
| 2011/0267492 A1* | 11/2011 | Prentice | G03B 7/08 348/223.1 |
| 2011/0293259 A1* | 12/2011 | Doepke | G03B 7/08 396/236 |
| 2012/0019687 A1* | 1/2012 | Razavi | H04N 5/23241 348/231.6 |
| 2012/0133793 A1* | 5/2012 | Inaba | H04N 5/2351 348/229.1 |
| 2012/0262599 A1* | 10/2012 | Brunner | 348/222.1 |
| 2014/0168486 A1* | 6/2014 | Geiss | H04N 5/335 348/294 |

FOREIGN PATENT DOCUMENTS

EP  1311114  5/2003

* cited by examiner

Primary Examiner — Justin P Misleh
(74) Attorney, Agent, or Firm — Kunzler Law Group

(57) ABSTRACT

A system comprises a digital imaging system for capturing digital images. The system includes a controller that captures at least one digital image, determines a brightness level of at least one bright region of the digital image, and generates brightness data representing the brightness level of the at least one bright region. The brightness data is compared with compositional information for determining a maximum brightness level of the at least one bright region of the digital image. The maximum brightness level comprises a level of brightness where information about the at least one bright region remains. The controller then determines an exposure value of a final digital image, where at least one region of the final digital image has a brightness level equal to or less than the maximum brightness level. At least one final digital image is then captured.

17 Claims, 6 Drawing Sheets

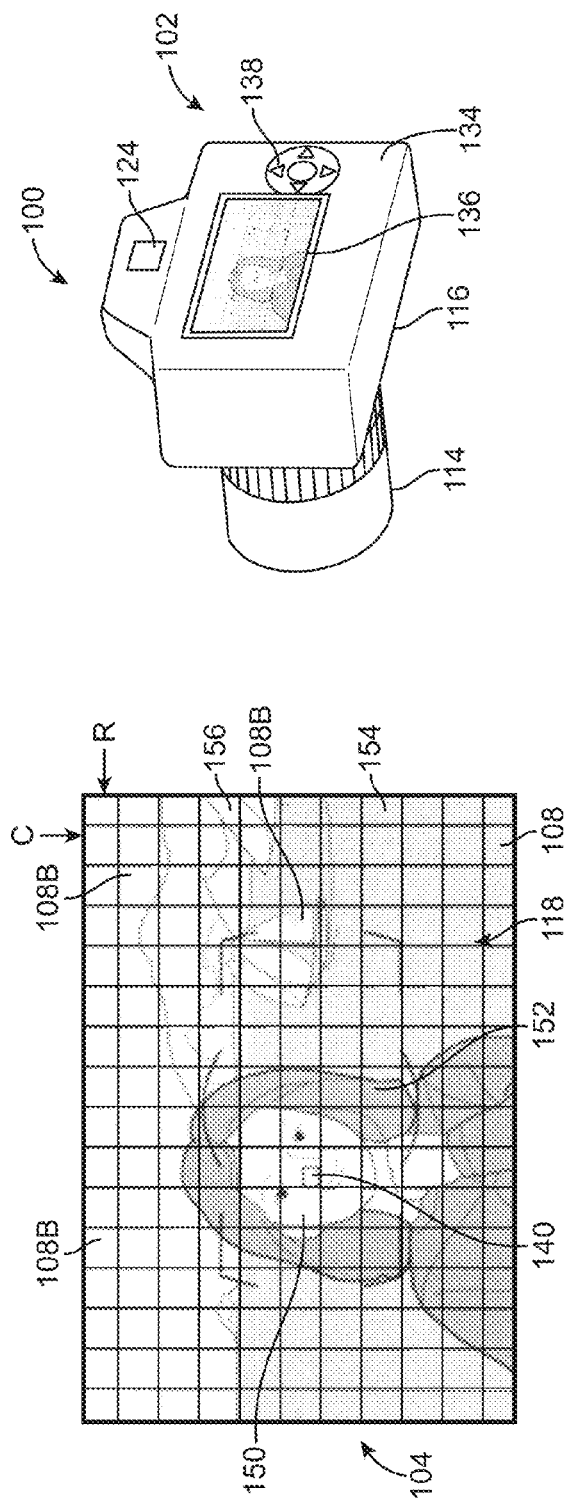
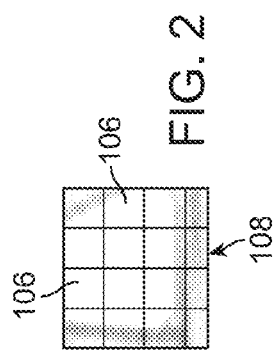
FIG. 1
FIG. 2

DIGITAL IMAGING EXPOSURE METERING SYSTEM

BACKGROUND

The present invention relates generally to capturing images with a digital camera, and more particularly, to a system for controlling overexposure of images produced by a digital camera.

Correct exposure is of fundamental importance in capturing digital images. Current digital imaging systems, such as digital single-lens reflex cameras, known as digital-SLRs or DSLRs, contain advanced digital image sensors and processors intended to ensure correct exposure. The digital image sensors used today are capable of capturing and producing images with low signal to noise ratio and a high dynamic range. On-board processors utilize use advanced algorithms to process the digital images received on the image sensor. However, even with advanced technology, achieving correct exposure is not always successful for many reasons.

Artistically, a "correct" exposure is a subjective matter and can depend on the photographer's intent and expectations of the image to be captured and photograph to be created. For example, consider taking a portrait photograph of a person standing indoors, in front of a bright window and outdoor scene. Since the human eye is capable of capturing a wider dynamic range of light than even the most advanced DSLRs, the photographer has to decide if they are going to expose for the person, where their face would be viewable, or expose for the bright scene that is viewable through the window. If the photographer sets their exposure for the person, the bright scene through the window will be overexposed and anything that would be visible through the window to the human eye shows as white in the photograph. In the case where the photographer sets their exposure for the bright scene through the window, the person's face is very dark and potentially unrecognizable in the photograph, since the DSLR does not have the ability to capture the wide dynamic range of the light between the person's face and the bright outdoor scene.

As can be appreciated, photographic compositions often contain both bright and dark regions, where the difference between those regions exceeds the maximum dynamic range of the DSLR's image sensor. In such situations, there exists no one exposure which could be considered "correct" for all possible desired artistic outcomes. Most DSLRs have a built-in exposure metering system that is used to measure the amount of light in a composition to be photographed. Once the amount of light in the composition is determined by the exposure meter, the shutter speed, aperture, and ISO settings may be set to give the best picture brightness or exposure.

The exposure metering system of most DSLRs is operable in different modes. Typical metering modes include: "evaluative" or "matrix" metering mode, "center-weighted" metering, and "spot" metering. In spot metering, measurements are made from a spot in the viewfinder of the camera about the size of a focusing bracket or point. The highlighted focus area, or spot, becomes the active spot for calculating exposure so everything inside the spot is averaged for exposure determination. The photographer typically uses a multi-selector button to move a focal point to different positions in the viewfinder. This allows the photographer to specify which region of the composition is to be used for metering to help ensure that the area of main interest will be properly exposed. However, for all but static shooting situations (e.g., studio shoots) there is not enough time to permit the photographer to perform spot metering, as the subject is moving, the lighting in the scene is changing, or both.

In center-weighted metering, the meter concentrates between 60 to 80 percent of exposure sensitivity towards the central part of the viewfinder. The balance of the metering calculation is then "feathered" out towards the edges of the image to be captured. Thus, in center-weighted metering, exposure is less influenced by small areas that vary greatly in brightness at the edges of the viewfinder, as many subjects are in the central part of the frame.

In evaluative or matrix metering mode, information is gathered from red, green, and blue sensors and factors in distance information provided by the DSLR's lens as it evaluates proper exposure calculation. This metering method analyzes a scene's overall brightness, contrast, and other lighting characteristics. Some matrix metering methods can then compare the scene received by the camera against an onboard database of potentially thousands of images, to determine what the exposure should be.

For example, the matrix metering system evaluates the relative brightness values for several regions in a composition together with the focus distance. The system then concludes that the photographer is shooting a portrait on the beach, where the subject is backlit against a large expanse of white sand. The system then sets an exposure to allow the subject's face to be properly exposed, while allowing the sand in the foreground to be overexposed.

While matrix metering systems, and the other metering systems discussed above, are moderately successful in a variety of common amateur snapshot situations, they are not sufficient to handle demanding, complex, and unusual lighting situations. Weddings, where people are often wearing high contrast black and white clothing, or theatrical performances, where there can be rapidly changing high contrast lighting, are a few examples of demanding and complex lighting situations. In these demanding lighting situations existing exposure metering systems typically do not provide consistently properly exposed images and frequently produce an image where the main subject of interest is either underexposed or overexposed.

Often an image captured by a DSLR may contain both properly exposed and underexposed regions. For DSLRs, moderate to significant amounts of underexposure can be compensated for in post-processing. Post-processing is where an image that has been captured and saved by the DSLR is uploaded to a computer and edited using digital image editing software. The underexposed regions of an image have lower signal-to-noise ratios (SNRs) than properly-exposed regions, which results in a lower image quality in those regions. However, using post-processing software, usable final images can often be obtained from underexposed images captured in the DSLR.

Where a significantly underexposed region of an image often contains useful information, a significantly overexposed region typically does not. In DSLRs, the significantly overexposed region of an image is recorded as pure white; where the Red color level, Blue color level, an Green color level are all equal to 255 on the RGB digital color table. In such an overexposed region, the overexposed region of the image will typically appear as a uniform area of maximum brightness, losing image detail and useful information. Thus, no image detail can be recovered in post-processing from the significantly overexposed region of the image. The significantly overexposed regions of an image recorded by a DSLR are often referred to by photographers as "blown-out highlights" or "blown highlights," where a highlight is a bright region of an image and the blown highlight is an overexposed portion thereof.

Blown highlights may be acceptable in some images where the highlights are not of primary interest in the photograph. For example, specular highlights resulting from reflections of light sources in metallic objects can be blown, without detracting from the main subject of the image. However, when the main regions of interest in the photograph are the brightest areas of the composition, blowing the highlights can mean a catastrophic failure of an image being produced. Such situations can include bridal portraits, where the highlights include the fine details of the bride's dress, and theatrical photography, where the subjects' faces are brightly lit against a dark background.

BRIEF SUMMARY

In one embodiment, a method comprises capturing at least one digital image, then generating data from the at least one digital image for determining more than one brightness level of the at least one digital image. The method then compares the data with compositional information for determining a maximum brightness level. The method then captures at least one final digital image where at least one bright region of the at least one final digital image has a brightness level equal to or less than the maximum brightness level In another embodiment, a method comprises capturing digital images at different exposure values, determining a brightness level of at least one bright region of each of the digital images, and then generating brightness data representing the brightness level of the at least one bright region of each of the digital images. The method then compares the brightness data with compositional information for determining a maximum brightness level of the at least one bright region of each of the plurality of digital images, the maximum brightness level comprising a level of brightness where information about the region remains, the compositional information comprising more than one of user input, compositional criteria, and awareness data. The method then continues with determining an exposure value of a final digital image to be captured where at least one bright region of the final digital image has a brightness level equal to or less than the maximum brightness level, and then capturing at least one final digital image where information about the at least one bright region of the at least one final digital image the region remains.

In another embodiment a system comprises a digital imaging system for capturing digital images. The system includes a controller. The controller captures at least one digital image, determines a brightness level of at least one bright region of the at least one digital image, and generates brightness data representing the brightness level of the at least one bright region of the at least one digital image. The controller then compares the brightness data with compositional information for determining a maximum brightness level of the at least one bright region of the at least one digital image, the maximum brightness level comprising a level of brightness where information about the at least one bright region remains, the compositional information comprising more than one of user input, compositional criteria, and awareness data. The controller then determines an exposure value of a final digital image to be captured where at least one region of the final digital image has a brightness level equal to or less than the maximum brightness level, and then captures at least one final digital image where information about the at least one region of the at least one final digital image the region remains.

In a further embodiment, a system comprises a digital imaging system for capturing a multiplicity of digital images. The system includes a controller. The controller captures a plurality of digital images and each of the plurality of digital images is captured at a different exposure value. The controller then determines a brightness level of each bright region of each of the plurality of digital images, generates brightness data representing the brightness level of each bright region of the plurality of digital images, and then compares the brightness data with compositional information for determining a maximum brightness level of each bright region of each of the plurality of digital images, the maximum brightness level comprising a level of brightness where information about the bright region remains, the compositional information comprising more than one of user input, compositional criteria, and awareness data. The controller then determines an exposure value of a final digital image to be captured where at least one region of the final digital image has a brightness level equal to or less than the maximum brightness level, and then captures at least one final digital image where information about the at least one region of the at least one final digital image the region remains.

BRIEF DESCRIPTION OF THE SEVERAL VIEWS OF THE DRAWINGS

FIG. 1 illustrates a system for capturing digital images including an exemplary digital image and digital device of an exemplary embodiment of the invention;

FIG. 2 illustrates a greatly enlarged view of a region of a digital image;

DETAILED DESCRIPTION

Figure 3A:
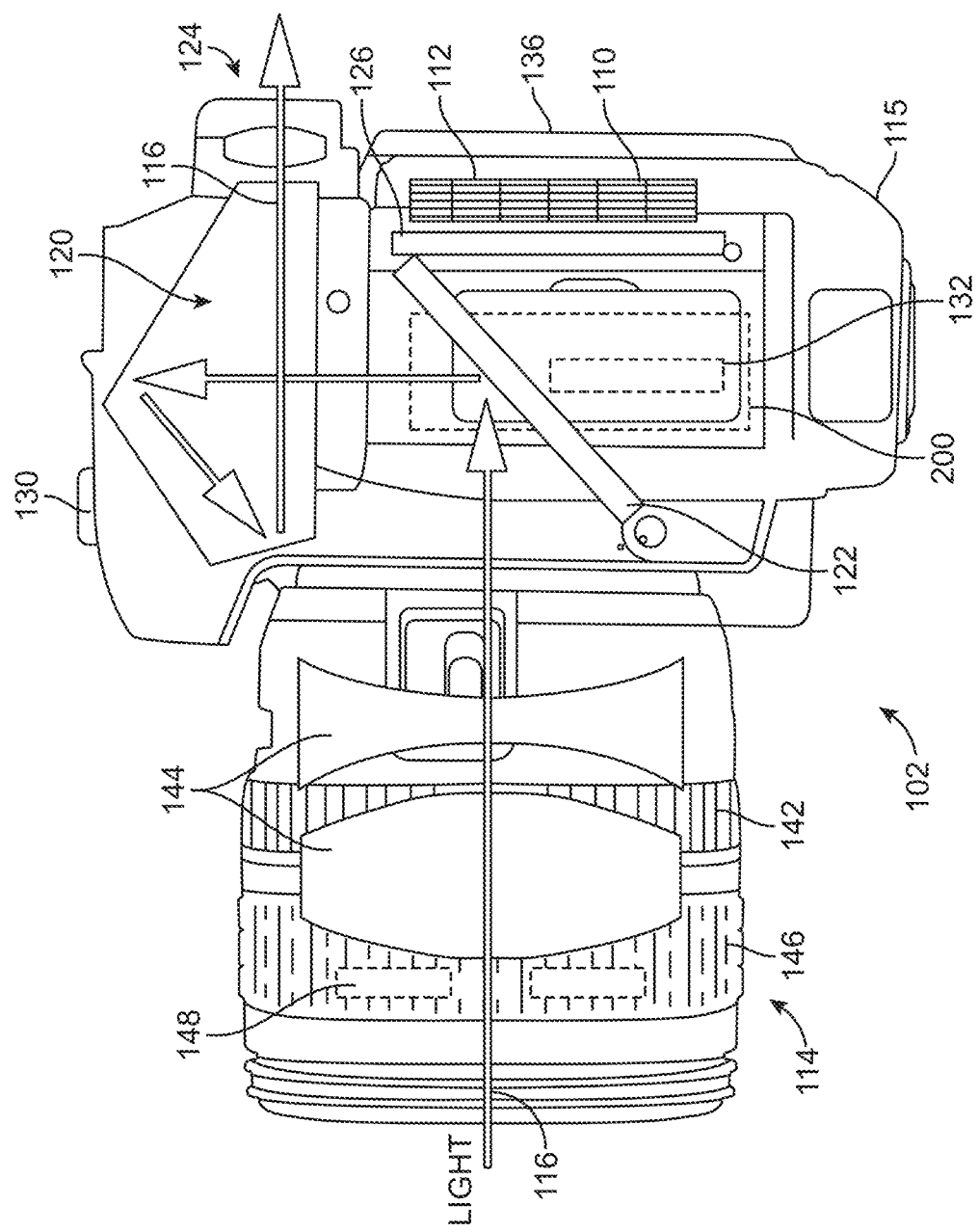
FIG. 3A is a simplified cutaway view of a digital camera in accordance with an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one embodiment, a method comprises capturing at least one digital image, then generating data from the at least one digital image for determining more than one brightness level of the at least one digital image. The method then compares the data with compositional information for determining a maximum brightness level. The method then captures at least one final digital image where at least one bright region of the at least one final digital image has a brightness level equal to or less than the maximum brightness level In another embodiment, a method comprises capturing digital images at different exposure values, determining a brightness level of at least one bright region of each of the digital images, and then generating brightness data representing the brightness level of the at least one bright region of each of the digital images. The method then compares the brightness data with compositional information for determining a maximum brightness level of the at least one bright region of each of the plurality of digital images, the maximum brightness level comprising a level of brightness where information about the region remains, the compositional information comprising more than one of user input, compositional criteria, and awareness data. The method then continues with determining an exposure value of a final digital image to be captured where at least one bright region of the final digital image has a brightness level equal to or less than the maximum brightness level, and then capturing at least one final digital image where information about the at least one bright region of the at least one final digital image the region remains.

In another embodiment a system comprises a digital imaging system for capturing digital images. The system includes a controller. The controller captures at least one digital image, determines a brightness level of at least one bright region of the at least one digital image, and generates brightness data representing the brightness level of the at least one bright region of the at least one digital image. The controller then compares the brightness data with compositional information for determining a maximum brightness level of the at least one bright region of the at least one digital image, the maximum brightness level comprising a level of brightness where information about the at least one bright region remains, the compositional information comprising more than one of user input, compositional criteria, and awareness data. The controller then determines an exposure value of a final digital image to be captured where at least one region of the final digital image has a brightness level equal to or less than the maximum brightness level, and then captures at least one final digital image where information about the at least one region of the at least one final digital image the region remains.

In a further embodiment, a system comprises a digital imaging system for capturing a multiplicity of digital images. The system includes a controller. The controller captures a plurality of digital images and each of the plurality of digital images is captured at a different exposure value. The controller then determines a brightness level of each bright region of each of the plurality of digital images, generates brightness data representing the brightness level of each bright region of the plurality of digital images, and then compares the brightness data with compositional information for determining a maximum brightness level of each bright region of each of the plurality of digital images, the maximum brightness level comprising a level of brightness where information about the bright region remains, the compositional information comprising more than one of user input, compositional criteria, and awareness data. The controller then determines an exposure value of a final digital image to be captured where at least one region of the final digital image has a brightness level equal to or less than the maximum brightness level, and then captures at least one final digital image where information about the at least one region of the at least one final digital image the region remains.

As will be appreciated by one skilled in the art, aspects of the present invention may be embodied as a system or method. Accordingly, embodiments of the present invention may take combine software and hardware and may generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For purposes of describing the embodiments disclosed herein, two elements are considered to be coupled when one element is able to send an electrical signal to another element. The electrical signal may represent, for example but not limited to, data, operating commands, status information, or electrical power, or any combination of these electrical signals. A coupling may be implemented by wired or wireless connection means.

Referring now to FIG. 1, there is shown generally at 100, an exemplary embodiment of a system for controlling overexposure of images produced by a digital imaging device.

The system 100 includes a digital imaging device 102 for capturing digital images 104. As referred to herein, it is to be understood that a digital image 104, or simply image 104, is a numeric representation of a two-dimensional image that is captured by the digital imaging device 102. As seen in FIG. 2, a digital image 104 has a finite set of digital values, called picture elements or pixels 106. The image 104 contains a fixed number of rows R and columns C of pixels 106 that define regions 108, some of which may be bright regions 108B, where each region 108/108B comprises a plurality of pixels 106. Pixels 106 are the smallest individual element in an image 104 holding quantized values that represent the brightness of a given color at any specific point, as is known in the art. The quantity of pixels 106 in each region 108/108B may be determined by the quantity of photo detectors 110 that comprise an image sensor 112, shown in FIG. 3A, and the dimensions of the region 108. Thus, if the image sensor 112 comprises a 12.3 megapixel sensor, the region 108/108B will have more pixels 106 than if the image sensor 112 comprises a 8 megapixel sensor, assuming that the dimensions of the region 108/108B are unchanged.

Figure 3B:
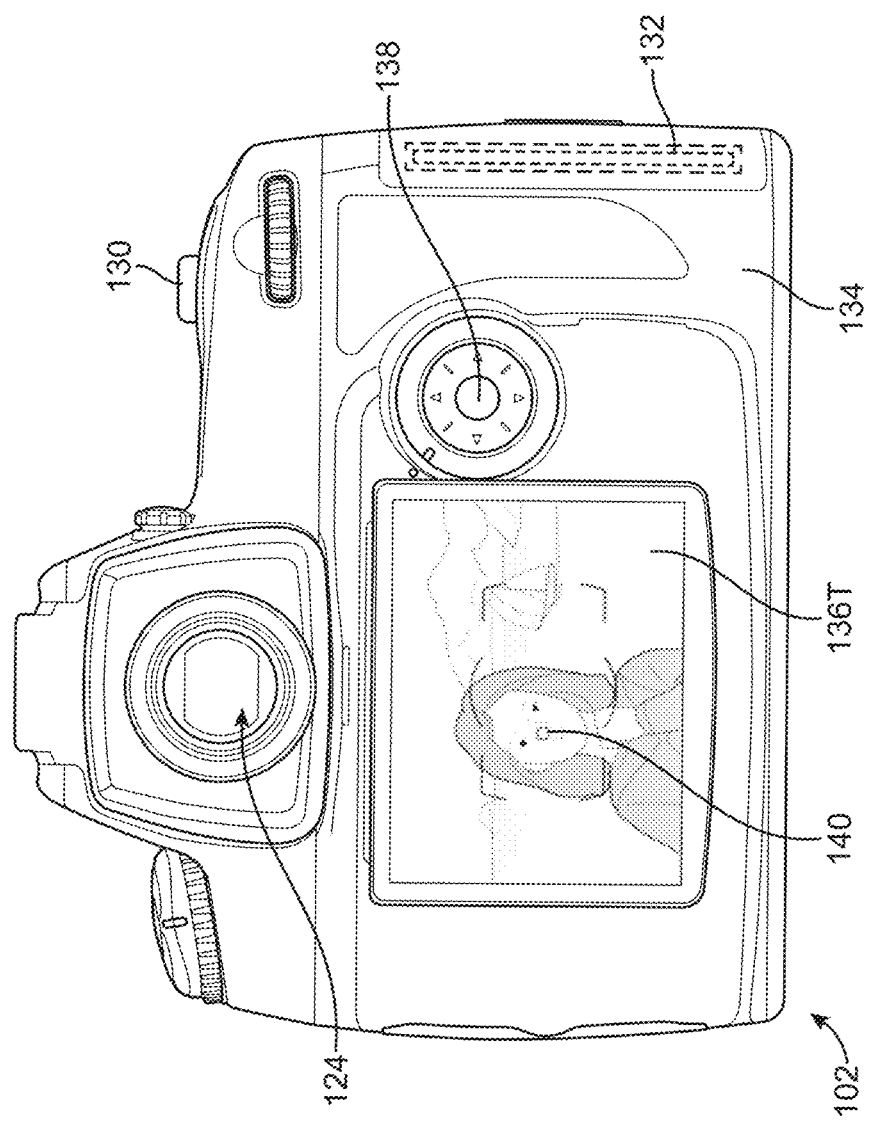
FIG. 3B is a simplified view showing a digital image displayed on a display of a digital camera in accordance with an exemplary embodiment of the invention.

As illustrated in FIG. 1, and FIGS. 3A-3B, in some embodiments, the digital imaging device 102 may comprise a known digital camera. In preferred embodiments, the digital imaging device 102 may comprise a known digital single-lens reflex camera, known in the art as a digital-SLR, or more commonly, "DSLR." The DSLR 102 is a camera that takes photographs by recording digital images 104 on the electronic image sensor 112. As referred to herein, it is to be understood that the electronic image sensor 112, or image sensor 112, is a device that receives an optical image and converts the image into an electronic signals, as known in the art. When light strikes the image sensor 112 it is held as a small electrical charge in each photo detector 110 of the sensor 112. The electrical charges are then converted to voltage one photo detector 110 at a time as they are read from the sensor 112. Additional circuitry in the DSLR 102 then converts the voltage into digital information, discussed hereinafter.

In some embodiments, the DSLR 102 includes a lens 114 is mounted on a body 115 of the camera 102. The lens 114 captures light 116 from a scene 118 and directs it through the lens 114. Light 116 travels through the lens 114 until it is directed upward to a viewing system 120 by a movable mirror 122, in a viewing position (shown in FIG. 3A), where the mirror 122 is maintained at a 45° angle to light 116 traveling through the lens 114. When the movable mirror 122 is in the viewing position, light 116 is directed through the viewing system 120 and to a viewfinder 124 of the DSLR 102 to allow a photographer (not shown) to view the scene 118 through the lens 114. The viewing system 120 may comprise either a pentamirror or pentaprism, as known in the art.

The DSLR 102 also includes a shutter 126, or other similar mechanism, actuated by a shutter release button 130, to control how long light 116 passing through the lens 114 can expose the image 104 on the sensor 112. Once the shutter release button 130 is depressed, the movable mirror 122 is rotated upwardly and out of the light 116 and the shutter 126 is opened for a finite period of time, so that the image sensor 112 receives any light 116 traveling through the lens 114 for recording images 104 on the sensor 112. The speed of the shutter 126, known in the art as "shutter speed", is the effective length of time the camera's shutter 126 is open, where light 116 reaches the image sensor 112. Light 116 is absorbed by the image sensor 112 as long as the shutter 126 is open. Once the shutter 126 is closed, the mirror 122 is rotated back to the viewing position. Images 104 recorded on the image sensor 112 are then stored on a memory card 132. The memory card 132 may comprise any suitable known electronic flash memory data storage device used for storing digital information, as is known in the art.

Figure 5:
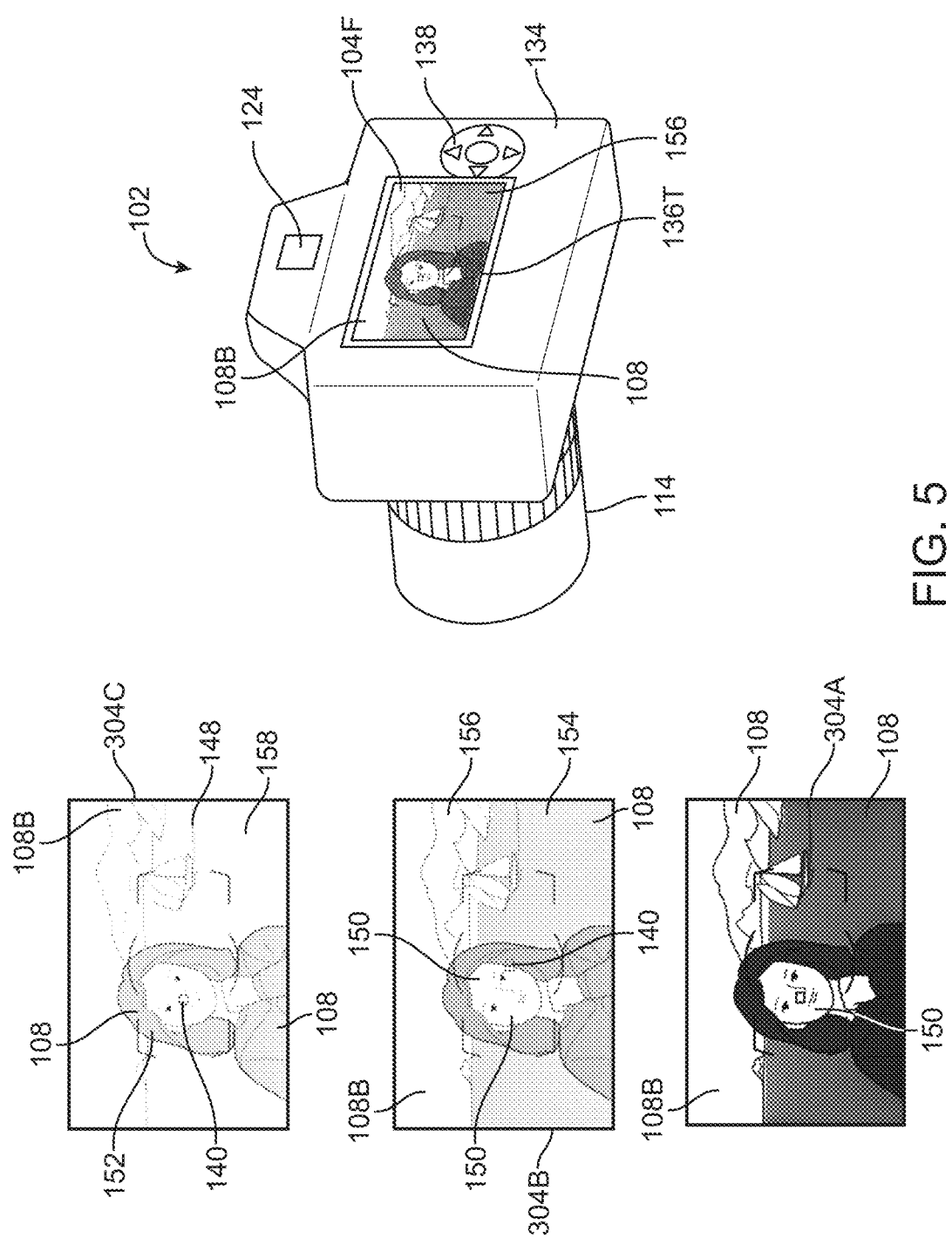
FIG. 5 illustrates a system for capturing digital images that includes a digital imaging device where a plurality of test images are captured, according to an exemplary embodiment of the invention.

As shown in FIG. 1 and FIG. 3B, in some embodiments, a back side 134 of the DSLR 102 may have an image display 136 for displaying test images and final images (both shown in FIG. 5) captured by the camera 102. The image display 136 may also function as an electronic viewfinder for viewing the scene 118 before an image 104 is captured and saved. As seen in FIG. 5, in some exemplary embodiments, the display 136 may comprise a touch-screen or touch-sensitive screen 136T. Once a photographer captures a desired image 104, the image 104 may be displayed on the touch-screen display 136T. The photographer may then touch the display 136T to select a portion of a region 108/108B, or region 108/108B, or regions 108/108B of interest of the image 104 for manipulation, discussed hereinafter.

In optional embodiments, a multi selector button 138 is provided on the back side 134 of the DSLR 102. The multi selector button 138 may allow for positioning and repositioning a cursor 140 on the image display 136/136T and for initiating an action after the cursor 140 has been moved to a selected position on the image display 136/136T. In some embodiments, the multi selector button 138 may also be actuated to increase the magnification of the image 104, known in the art as "zoom in", to view a desired region or regions 108/108B of the image 104 more clearly.

Figure 4:
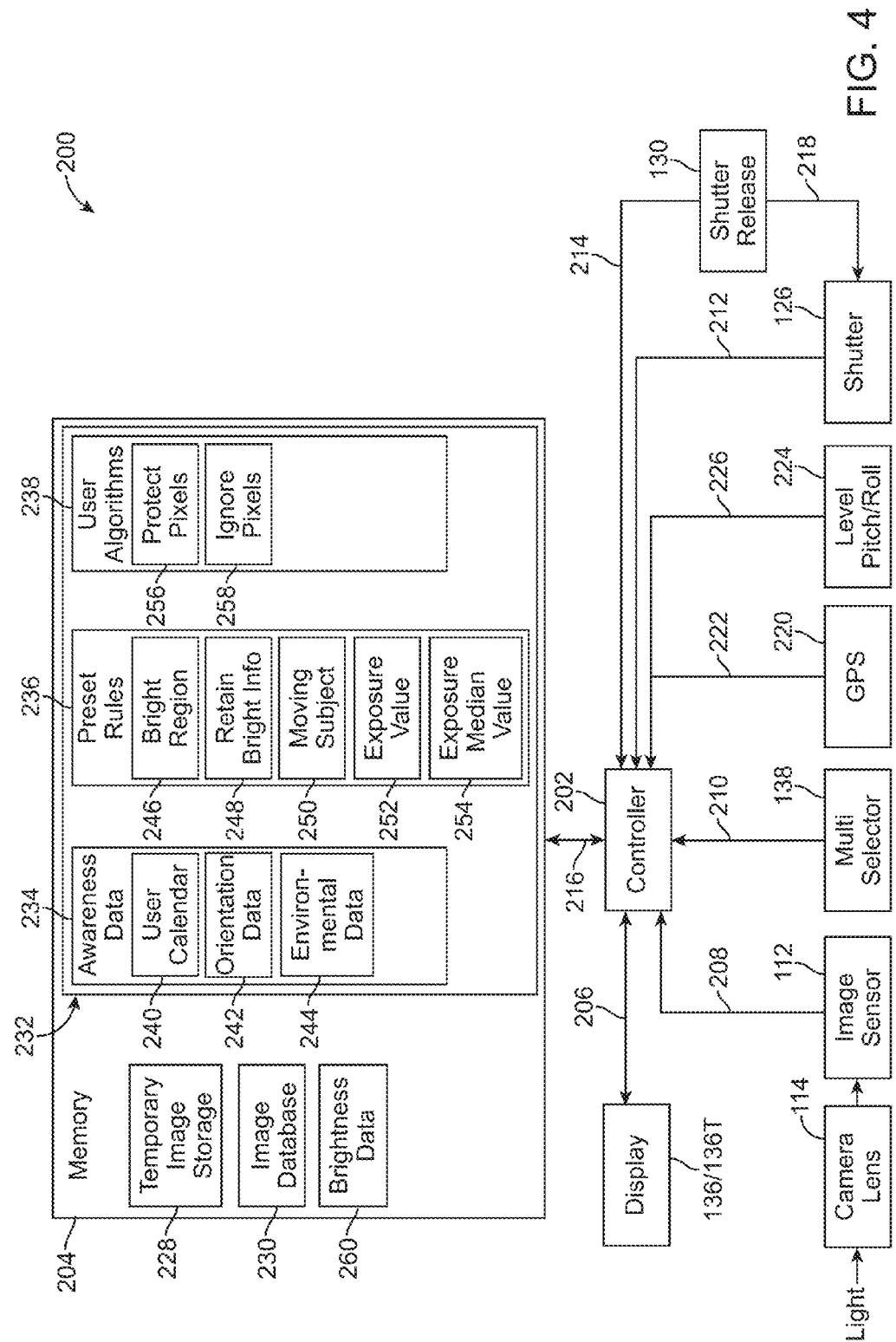
FIG. 4 illustrates a simplified block diagram of an image processing system in accordance with an embodiment of the invention.

As illustrated in FIG. 3A and FIG. 4, the DSLR 102 includes an image processing system, shown generally at 200. The processing system 200 receives images 104 recorded on the image sensor 112, processes the images 104, and outputs them to the memory card 132. Processing of images recorded on the image sensor 112 may comprise any of several different known image correction tasks, image output tasks, and many other image tasks. In some embodiments, these tasks may include: Bayer filtering, demosaicing, image sensor corrections or dark-frame subtraction, image noise reduction, image sharpening, image scaling, gamma correction, image enhancement, color-space conversion, chroma sub-sampling, frame-rate conversion, lens corrections, image compression, including JPEG encoding, and numerous other tasks.

In some embodiments, the image processing system 200 of the invention includes a controller 202, that may comprise a Central Processor (CPU), and a memory 204. In preferred embodiments, the controller 202 is connected to the image display 136/136T by a display data bus 206, to the image sensor 112 via data lines 208, to the multi selector button 138 via data lines 210, to the shutter 126 via data lines 212, to the shutter release button 130 via data lines 214, and to the memory 204 via memory data and address lines 216. Additionally, the shutter release button 130 is connected to the shutter 126 via data lines 218.

In some optional embodiments, the processing system 200 may include a Global Positioning System (GPS) 220 connected to the controller 202 via data lines 222. The GPS 220 may provide location information for images 104 captured by the DSLR 102. Optionally, the image processing system 200 may also include an electronic level 224 connected to the controller 202 via data lines 226. The electronic level 224 may be provided for maintaining the DSLR 102 level while capturing images 104 and for providing pitch and roll, yaw, skew, and similar information.

In some preferred embodiments, the memory 204 includes temporary image storage 228 for temporarily storing images 104 processed by the controller 202. In addition to temporary image storage 228, the memory 204 may also include an onboard image database 230 that may contain a multiplicity of images (not shown). The controller 202 can compare images in the image database 230 to images 104 captured by the image sensor 112 to determine an exposure level of the captured image 104.

As shown in FIG. 4, compositional criteria, shown generally at 232 may additionally be stored in the memory 204. In some embodiments, the compositional criteria 232 may include awareness data 234, preset rules 236, and user input algorithms 238.

In some exemplary embodiments, the awareness data 234 may include user calendar data 240. The user calendar data 240 may be parsed for determining at least one of an event and a geographic location, where digital images 104 are captured. Information indicating the geographic location of images 104 captured may be provided by the GPS 220. The awareness data 234 may optionally further comprise orientation data 242 and environmental data 244. The orientation data 242 may be provided for determining at least one of the subject and/or perspective of the images 104 captured and may be generated from information provided by provided by the GPS 220. The orientation data 242 may include pitch and roll, yaw, skew, and other orientation data and may be provided by both the electronic level 224 and GPS 220 and processed by the controller 202. Similarly, the environmental data 244 may be provided for identifying and determining geographical regions of the images 104 captured. In optional embodiments, the awareness data 234 may include the onboard image database 230. The above-discussed awareness data 234 is for exemplary purposes only and is not an exhaustive list. It is to be understood that may other types of data that may be utilized as awareness data 234, as described herein, may be realized persons of ordinary skill in the art.

In some exemplary embodiments, the preset rules 236 may comprise any number and/or type of rules that may pertain to and/or define information retained in portion of a region 108/108B, or a region 108/108B, or regions 108/108B of an image 104, or digital images 104 captured by the DSLR 102. Some exemplary preset rules 236 may comprise: Bright Region 246, Retain Bright Info 248, Moving Subject 250, Exposure Value 252, and Exposure Median Value 254. Rule Bright Region 246 may ensure that the at least one bright region of a final digital image captured contains information about the region 108, in one exemplary embodiment. In rule Retain Bright Info 248, pixels in the at least one bright region of the final digital image are exposed, such that less than about 5 percent of the pixels do not contain information, in one exemplary embodiment. Rule Moving Subject 250 ensures that pixels in the at least one bright region of the final digital image that correspond to a subject moving in the final digital image contain information about the subject moving, in some embodiments. In one embodiment, Rule Exposure Value 252 ensures that pixels in the final digital image having an exposure value of less than or equal to about 0.75 of the maximum brightness level of the final digital image contain information. In rule Exposure Median Value 254, it is ensured that pixels in the final digital image having an exposure value within 3 exposure values, for example, of a median exposure value of the final digital image contain information. It is to be understood that the above-discussed preset rules 236 are for exemplary purposes only and are not an exhaustive list. Many other rules and/or type of rules that may pertain to and/or define information retained in a region 108/108B, or portion of a region 108/108B, as described herein, may be realized by persons of ordinary skill in the art.

In some exemplary embodiments, the user input algorithms 238 may be provided to allow a photographer to provide direct input as to how the pixels in all or a portion of a region 108/108B, and/or one or more regions region 108/108B of a digital image 104, or digital images 104, are to be processed. In some exemplary embodiments, when the display comprises a touch-screen display 136T, once the photographer captures a desired image 104, the image 104 may then be displayed on the DSLR's display touch-screen display 136T. The photographer may then touch the display 136T to select a portion of a region 108/108B, or region 108/108B, or regions region 108/108B of the image 104. Once the desired information of the image 104 is selected, the photographer may then desire to protect or ignore those pixels 106 in the selected region or regions 108/108B, using a Protect Pixel Algorithm 256 or an Ignore Pixel Algorithm 258. It is to be understood that various other user algorithms 238 that may allow a photographer, or other user, to manipulate or edit a select a portion of a region 108/108B, or region 108/108B, or regions region 108/108B of the image 104, as described herein, may be realized by persons of ordinary skill in the art.

In some embodiments, the photographer can indicate intent using the multi selector button 138, to invoke the desired algorithm 256, 258. Additionally, the photographer may use the multi selector button 138 to position the cursor 140 in a desired region or regions 108/108B and navigate to the different regions region 108/108B of the image 104. In some embodiments, the multi selector button 138 may then be actuated to increase the magnification of the image 104. The photographer may then select the desired portion of a region 108/108B, or region 108/108B, or regions region 108/108B of the digital image 104 and invoke the desired user input algorithm 256, 258.

Referring to the drawing Figures, the photographer looks through the DSLR's viewfinder 124 to view and compose the scene 118. They may rotate a focus ring 142, coupled to lens elements 144 of the lens 114 to bring the scene 118 into focus. The photographer may also rotate an aperture ring 146 adjust the size of an aperture 148 of the lens 114 to achieve a desired depth of field and/or to control how much light 116 enters the lens 114 and exposes the scene 118 as an image 104 on the image sensor 112. In photography, depth of field (DOF) is the distance between the nearest and farthest objects in a scene that appear acceptably sharp in an image. Although the lens 114 can precisely focus at only one distance at a time, the decrease in sharpness is gradual on each side of the focused distance. In some cases, it may be desirable to have the entire image sharp, and a large DOF is appropriate. In other cases, a small DOF may be more effective, emphasizing the subject while de-emphasizing the foreground and background. As known in the art, adjusting the size of the aperture 148 or speed of the shutter 126, or both, can be performed either by the photographer or automatically by the DSLR 102.

Another means for adjusting exposure level of the image 104 is "ISO." ISO relates to how sensitive the image sensor 112 is to the amount of light present. ISO is typically expressed in a numerical value such as: 100, 200, 400 . . . , where the greater the ISO number, the more sensitive to light the sensor 112 becomes. For example, in situations where the photographer has a desired aperture 148 and shutter speed, to achieve a desired artistic effect for example, the ISO can be adjusted to expose the image 104 on the image sensor 112 as desired by the photographer.

Referring still to the drawing Figures, and particularly to FIG. 1, FIG. 4, and FIG. 5, the scene 118 comprises a plurality of subject features. For ease of discussion only, the subject features in the exemplary scene 118 may include a person's face 150, the person's hair 152, water 154, and land 156. As can be appreciated, each subject feature 150, 152, 154, 156 of the scene 118 may have a different brightness level and that it may be difficult to expose for an intended subject feature, such as the person's face 150, without overexposing the water 154.

Once the photographer is ready to capture the scene 118 for creating a digital test image 304A, they depress the shutter release button 130 to actuate the shutter 126. In embodiments of the invention, upon actuation of the shutter release button 130, the controller 202 may actuate the shutter 126 at least once to capture at least one test image 304A. In some embodiments, the controller 202 may actuate the shutter 126 more than once to capture more than one test image 304A, 304B. In some preferred embodiments, the controller 202 may actuate the shutter 126 a plurality of instances to capture a plurality of test images 304A, 304B, 304C. The controller 202 stores each test image 304A, 304B, 304C captured in the temporary image storage 228 in memory 204. It is to be understood, that the controller 202 may actuate the shutter 126 at least once and up to a plurality of instances to expose at least one test image 304A and up to a plurality of test images 304A, 304B, 304C, and that three test images 304A, 304B, 304C are shown for ease of discussion only.

In preferred embodiments, each test image 304A, 304B, 304C is captured at a different exposure level. In some embodiments, at least one of the speed of the shutter 126, size of the aperture 148, and ISO (the sensitivity to light of the image sensor 112) is adjusted. In some preferred embodiments only one of the speed of the shutter 126, aperture 148, and ISO is adjusted when a plurality of test images 304A, 304B, 304C are captured.

In one embodiment, for each successive test image 304B, 304C, the speed of the shutter 126 is incrementally slowed, causing the shutter 126 to be open longer to allow light 116 to be absorbed by the image sensor 112 longer for increasing the exposure level of each succeeding test image 304B, 304C. For example, the speed of the shutter 126 to expose the second test image 304B is longer than the speed of the shutter 126 to expose the first test image 304A. Similarly, the speed of the shutter 126 to expose the third test image 304C is longer than the speed of the shutter 126 to expose the second test image 304B.

In one optional exemplary process, the size of the aperture 148 may be increased incrementally with each actuation of the shutter 126 to increase the amount of light 116 traveling through the lens 114 and absorbed by the image sensor 112, while the speed of the shutter 126 remains constant to increase the exposure of each succeeding test image 304B, 304C. For example, the size of the aperture 148 to expose the second test image 304B is larger than the size of the aperture 148 to expose the first test image 304A. Similarly, the size of the aperture 148 to expose the third test image 304C is larger than the size of the aperture 148 to expose the second test image 304B.

In another optional exemplary process, the ISO of the image sensor 112 may be increased incrementally with each shutter actuation to increase the sensitivity to light of the image sensor 112 to increase the exposure level of each succeeding test image 304B, 304C, while the speed of the shutter 126 and size of the aperture 148 remain constant. For example, the ISO of the image sensor 112 to expose the second test image 304B is greater, making the image sensor 112 more sensitive to light 116, than the size ISO of the image sensor 112 of the first test image 304A. Similarly, the ISO of the image sensor 112 to expose the third image 104C is greater, making the image sensor 112 more sensitive to light 116, than the size ISO of the image sensor to expose the second test image 304B.

In the above-described optional exemplary process, preferably only one of the speed of the shutter 126, aperture 148, and ISO of the image sensor 112, such as the speed of the shutter 126 is adjusted while capturing test images 304A, 304B, 304C, while the other of the speed of the shutter 126, aperture 148, and ISO of the image sensor 112, such as the aperture 148, and ISO of the image sensor 112, remain constant. In some optional embodiments, more than one of the speed of the shutter 126, aperture 148, and ISO of the image sensor 112, such as the speed of the shutter 126 and ISO are adjusted, while the remaining of the speed of the shutter 126, aperture 148, and ISO of the image sensor 112, such as the aperture 148, remains constant.

In some embodiments, the controller 202 determines a brightness level of at least one region 108/108B of each of the test images 304A, 304B, 304C for determining a maximum brightness level 158 (best seen in test image 304C of FIG. 5) The maximum brightness level 158 comprises a level of brightness where information about the region 108/108B remains. In some preferred embodiments, the controller 202 determines a brightness level of each bright region 108B of each test image 304A, 304B, 304C. Once the controller 202 has determined the brightness level of each of the plurality of regions 108/108B of each test image 304A, 304B, 304C, the controller 202 generates brightness data 260 and stores the brightness data 260 in memory 204. The controller 202 then determines if any of the plurality of regions 108/108B in any of the test images 304A, 304B, 304C are overexposed. If a portion of a region 108/108B, or all of a region 108/108B of a test image 304A, 304B, 304C is recorded as pure white; where the Red color level, Blue color level, an Green color level are all equal to 255 on the RGB digital color table, that region 108/108B or portion of a region 108/108B is considered overexposed.

Upon determining the brightness level of at least one region 108, which may comprise a bright region 108B, of the plurality of regions 108/108B of at least one test image 304A, 304B, 304C and generating brightness data 260, the brightness data 260 is compared to selected compositional criteria 232 for determining a maximum brightness level 158 of at least one region 108/108B of the test images 304A, 304B, 304C, for determining an exposure value of a final image 104F to be captured, shown in the DSLR's display 136T in FIG. 5, where at least one region 108/108B of the final image 104F has a brightness level equal to or less than the maximum brightness level 158.

The selected compositional criteria 232 may comprise more than one of awareness data 234, preset rules 236, and user input algorithms 238. For example, awareness data 234, such as the environmental data 244 may be processed while the user calendar data 240 is parsed. The controller 202 may compare the environmental data 244 and user calendar data 240 and determine that the photographer is at a lake (water 154) capturing test images 304A, 304B, 304C where the primary subjects are people, as shown by the subject's face 150 and hair 152, in the exemplary scene 118. Optionally, the controller 202 may then compare the brightness data 260 and awareness data 234, which may include images in the onboard image database 230, for determining what the scene 118 comprises, such as people (subject's face 150 and hair 152) at a lake (water 154), for determining a maximum brightness level 158 of a test image 304C of at least one region 108, or one bright region 108B of the test images 304A, 304B, 304C.

In some alternative embodiments, once the shutter release 130 is depressed, the controller 202 actuates the shutter 126 once to capture a single test image 304C. The controller 202 then processes the test image 304C to determine a brightness level of at least one region 108, which may be a bright region 108B, of the image 304C. The controller 202 then generates brightness data 260 and stores the data in memory 204. The test image 304C, and optionally the brightness data 260, may then be displayed on the DSLR's display 136/136T for viewing and/or selection by the photographer.

Additionally, the selected compositional criteria 232 may optionally comprise one or more of the preset rules 236 and user input algorithms 238. In some exemplary embodiments, the controller 202 may analyze the brightness data 260, awareness data 234, and images in the image database 230 and then determine that pixels 106 (shown in FIG. 2) in the at least one bright region 108B of the final digital image 104F should be exposed, such that less than about 5 percent of the pixels 106 do not contain information about the region 108/108B. The controller 202 then adjusts at least one of the speed of the shutter 126, aperture 148, and ISO of the image sensor 112 and actuates the shutter 126 to capture at least final digital image 104F, shown in FIG. 5, that has the desired exposure. The photographer may then touch the touch-screen display 136T to select a portion of a region 108/108B, or region 108/108B, or regions 108/108B of interest of the test image 304C. The photographer may then desire to protect or ignore those pixels 106 in the selected region or regions 108/108B, using a Protect Pixel Algorithm 256 or an Ignore Pixel Algorithm 258.

Figure 6:
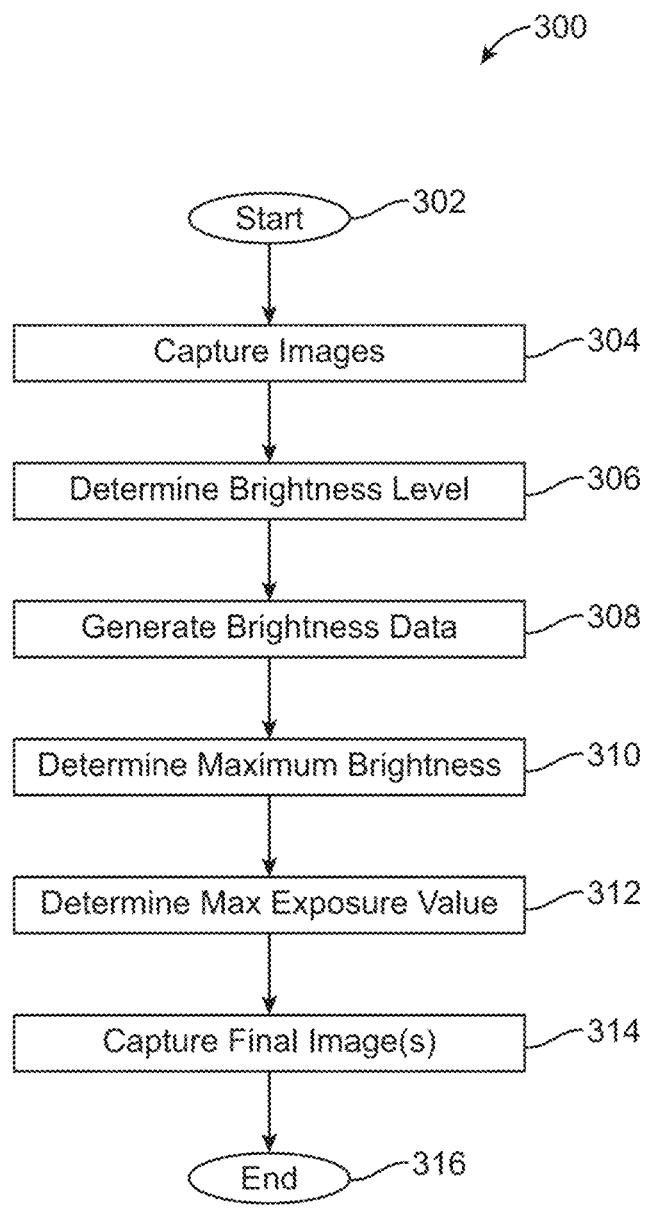
FIG. 6 is a flowchart showing an exemplary process for controlling overexposure of images produced by a digital camera in accordance with an exemplary embodiment of the invention.

Referring to FIGS. 1-6, and particularly to FIG. 6, a flow diagram of an exemplary embodiment of a process for controlling overexposure of images 104 produced by a digital camera 102 in accordance with the invention, is shown generally at 300. The process 300 starts with start block 302. In process block 304, the DSLR 102 captures a plurality of digital images 104, which may comprise a plurality of test images 304A, 304B, 304C. Each of the plurality of test images 304A, 304B, 304C is captured at a different exposure value, in a preferred embodiment. In process block 306, a brightness level of at least one region 108, which preferably includes at least one bright region 108B, of each of the plurality of test images 304A, 304B, 304C is determined. The controller 202 then generates brightness data 260 that represents the brightness level of the at least one region 108, which preferably includes at least one bright region 108B, of each of the plurality of test images 304A, 304B, 304C, in process block 308.

The process 300 then continues to process block 310, where the brightness data 260 is compared with compositional criteria 232 for determining a maximum brightness level 158 of at least one region 108, which preferably includes at least one bright region 108B, of each of the plurality of test images 304A, 304B. The maximum brightness level 158 comprises a level of brightness where information about the region 108/108B remains. In preferred embodiments, the compositional criteria 232 may comprise more than one of awareness data 234, preset rules 236, and user input algorithms 238.

The process 300 then continues to process block 312, where an exposure value of a final digital image 140F to be captured is determined. In some embodiments, at least one region 108, which preferably includes at least one bright region 108B, of the final digital image 140F has a brightness level equal to or less than the maximum brightness level 158. The process 300 then continues to process block 314 where at least one final digital image 140F is captured. The process 300 then ends with end block 316.

There has been described a system for capturing digital images. The controller captures at least one digital image, determines a brightness level of at least one bright region of the at least one digital image, and generates brightness data representing the brightness level of the at least one bright region of the at least one digital image. The controller then compares the brightness data with compositional information for determining a maximum brightness level of the at least one bright region of the at least one digital image, the maximum brightness level comprising a level of brightness where information about the at least one bright region remains, the compositional information comprising more than one of user input, compositional criteria, and awareness data. The controller then determines an exposure value of at least one final digital image to be captured where at least one region of the final digital image has a brightness level equal to or less than the maximum brightness level, and then captures the final digital image where information about the at least one region of the final digital image the region remains.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:
1. A method comprising:
capturing a test image, the test image captured using a predefined exposure value;
determining a brightness level of one or more regions of the test image, wherein each region of the one or more regions comprises at least a portion of the test image that is defined by a predefined number of pixels, the predefined number of pixels of each region of the one or more regions determined based on a number of photo detectors of an image sensor used to capture the test image;
generating brightness data representing the brightness level of each region of the one or more regions of the test image;
determining a maximum brightness level for each region of the one or more regions of the test image based on the brightness data and compositional criteria, the compositional criteria comprising awareness data for determining what a scene of the test image comprises, the awareness data comprising:
orientation data, the orientation data used to determine at least one of a subject and a perspective of the test image;
one or more previously captured images that are stored in an image database, the one or more previously captured images used to determine what is in the scene of the test image; and
one or more of:
calendar data, the calendar data used to determine at least one of an event and a geographic location where the test image is captured; and environmental data, the environmental data used to determine one or more geographical regions in the test image, wherein the maximum brightness level for each region of the one or more regions comprises a level of brightness where information about each region of the one or more regions remains and is not overexposed, an overexposed region comprising at least a portion of a region of the one or more regions that is pure white;

determining an exposure value of a final digital image to be captured based on the maximum brightness level determined for each region of the one or more regions of the test image, the final digital image having regions such that each region of the final digital image has a brightness level equal to or less than the determined maximum brightness level; and capturing at least one final digital image according to the determined exposure value.

2. The method of claim 1, wherein the compositional criteria further comprises one or more preset rules, the one or more preset rules comprising at least one of:

exposing pixels in a region of the final digital image such that less than 5 percent of the pixels are overexposed;

ensuring that pixels in a region of the final digital image that correspond to a subject moving in the final digital image contain pixels that are not overexposed;

ensuring that pixels in the final digital image having an exposure value of less than or equal to 0.75 of the maximum brightness level of the final digital image are not overexposed; and ensuring that pixels in the final digital image having an exposure value within 3 exposure values of a median exposure value of the final digital image are not overexposed.

3. The method of claim 1, wherein the orientation data comprises at least one of global positioning system data, pitch and roll data, yaw data, and skew data.

4. The method of claim 1, wherein the compositional criteria comprises user input algorithms, the user input algorithms selected by a user manipulating a display on the apparatus to determine a subject of interest.

5. The method of claim 1, wherein the display comprises a touch-sensitive display.

6. An apparatus comprising:
a processor;
a memory that stores code executable by the processor to:
capture a test image, the test image capture using a predefined exposure value;
determine a brightness level of one or more regions of the test image, wherein each region of the one or more regions comprises at least a portion of the test image that is defined by a predefined number of pixels, the predefined number of pixels of each region of the one or more regions determined based on a number of photo detectors of an image sensor used to capture the test image;
generate brightness data representing the brightness level of each region of the one or more regions of the test image;
determine a maximum brightness level for each region of the one or more regions of the test image based on the brightness data and compositional criteria, the compositional criteria comprising awareness data for determining what a scene of the test image comprises, the awareness data comprising:

orientation data, the orientation data used to determine at least one of a subject and a perspective of the test image;

one or more previously captured images that are stored in an image database, the one or more previously captured images used to determine what is in the scene of the test image; and one or more of:
calendar data, the calendar data used to determine at least one of an event and a geographic location where the test image is captured; and
environmental data, the environmental data used to determine one or more geographical regions in the test image, wherein the maximum brightness level for each region of the one or more regions comprises a level of brightness where information about each region of the one or more regions remains and is not overexposed, an overexposed region comprising at least a portion of a region of the one or more regions that is pure white;

determine an exposure value of a final digital image to be captured based on the maximum brightness level determined for each region of the one or more regions of the test image, the final digital image having regions such that each region of the final digital image has a brightness level equal to or less than the determined maximum brightness level; and capture at least one final digital image according to the determined exposure value.

7. The apparatus of claim 6, wherein the compositional criteria further comprises one or more preset rules, the one or more preset rules comprising at least one of:

exposing pixels in a region of the final digital image such that less than 5 percent of the pixels are overexposed;

ensuring that pixels in a region of the final digital image that correspond to a subject moving in the final digital image contain pixels that are not overexposed;

ensuring that pixels in the final digital image having an exposure value of less than or equal to 0.75 of the maximum brightness level of the final digital image are not overexposed; and ensuring that pixels in the final digital image having an exposure value within 3 exposure values of a median exposure value of the final digital image are not overexposed.

8. The apparatus of claim 6, wherein the orientation data comprises at least one of global positioning system data, pitch and roll data, yaw data, and skew data.

9. The apparatus of claim 6, wherein the compositional criteria comprises user input algorithms, the user input algorithms selected by a user manipulating a display on the apparatus to determine a subject of interest.

10. The apparatus of claim 9, wherein the display comprises a touch-sensitive display.

11. A system comprising:
a digital imaging system for capturing digital images, the system including a controller, the controller:
capturing a test image, the test image captured using a predefined exposure value;
determining a brightness level of one or more regions of the test image, wherein each region of the one or more regions comprises at least a portion of the test image that is defined by a predefined number of pixels, the predefined number of pixels of each region of the one or more regions determined based on a number of photo detectors of an image sensor used to capture the test image;

generating brightness data representing the brightness level of each region of the one or more regions of the test image;

determining a maximum brightness level for each region of the one or more regions of the test image based on the brightness data and compositional criteria, the compositional criteria comprising awareness data for determining what a scene of the test image comprises, the awareness data comprising:

orientation data, the orientation data used to determine at least one of a subject and a perspective of the test image;

one or more previously captured images that are stored in an image database, the one or more previously captured images used to determine what is in the scene of the test image; and one or more of:
calendar data, the calendar data used to determine at least one of an event and a geographic location where the test image is captured; and
environmental data, the environmental data used to determine one or more geographical regions in the test image, wherein the maximum brightness level for each region of the one or more regions comprises a level of brightness where information about each region of the one or more regions remains and is not overexposed, an overexposed region comprising at least a portion of a region of the one or more regions that is pure white;

determining an exposure value of a final digital image to be captured based on the maximum brightness level determined for each region of the one or more regions of the test image, the final digital image having regions such that each region of the final digital image has a brightness level equal to or less than the determined maximum brightness level; and capturing at least one final digital image according to the determined exposure value.

12. The system of claim 11, wherein the compositional criteria further comprises one or more preset rules, the one or more preset rules comprising at least one of:

exposing pixels in a region of the at least one final digital image such that less than 5 percent of the pixels are overexposed;

ensuring that pixels in a region of the at least one final digital image that correspond to a subject moving in the at least one final digital image are not overexposed;

ensuring that pixels in the at least one final digital image having an exposure value of less than or equal to 0.75 of the maximum brightness level of the at least one final digital image are not overexposed; and ensuring that pixels in the at least one final digital image having an exposure value within 3 exposure values of a median exposure value of the at least one final digital image are not overexposed.

13. The system of claim 11, wherein the orientation data comprises at least one of global positioning system data, pitch and roll data, yaw data, and skew data.

14. The system of claim 11, wherein the compositional criteria comprises user input algorithms, the user input algorithms selected by a user manipulating a display on the apparatus to determine a subject of interest.

15. The system of claim 14, wherein the display comprises a touch-sensitive display.

16. A program product comprising a non-transitory computer readable storage medium that stores code executable by a processor, the executable code comprising code to perform:

capturing a test image, the test image capture using a predefined exposure value;

determining a brightness level of one or more regions of the test image, wherein each region of the one or more regions comprises at least a portion of the test image that is defined by a predefined number of pixels, the predefined number of pixels of each region of the one or more regions determined based on a number of photo detectors of an image sensor used to capture the test image;

generating brightness data representing the brightness level of each region of the one or more regions of the test image;

determining a maximum brightness level for each region of the one or more regions of the test image based on the brightness data and compositional criteria, the compositional criteria comprising awareness data for determining what a scene of the test image comprises, the awareness data comprising:

orientation data, the orientation data used to determine at least one of a subject and a perspective of the test image;

one or more previously captured images that are stored in an image database, the one or more previously captured images used to determine what is in the scene of the test image; and one or more of:
calendar data, the calendar data used to determine at least one of an event and a geographic location where the test image is captured; and
environmental data, the environmental data used to determine one or more geographical regions in the test image, wherein the maximum brightness level for each region of the one or more regions comprises a level of brightness where information about each region of the one or more regions remains and is not overexposed, an overexposed region comprising at least a portion of a region of the one or more regions that is pure white;

determining an exposure value of a final digital image to be captured based on the maximum brightness level determined for each region of the one or more regions of the test image, the final digital image having regions such that each region of the final digital image has a brightness level equal to or less than the determined maximum brightness level; and capturing at least one final digital image according to the determined exposure value.

17. The program product of claim 16, wherein the compositional criteria further comprises one or more preset rules, the one or more preset rules comprising at least one of:

exposing pixels in a region of the at least one final digital image such that less than 5 percent of the pixels are overexposed;

ensuring that pixels a region of the at least one final digital image that correspond to a subject moving in the at least one final digital image are not overexposed;

ensuring that pixels in the final digital image having an exposure value of less than or equal to 0.75 of the maximum brightness level of the at least one final digital image are not overexposed; and ensuring that pixels in the final digital image having an exposure value within 3 exposure values of a median exposure value of the at least one final digital image are not overexposed.

* * * * *